(12) United States Patent
Zhang et al.

(10) Patent No.: US 12,196,425 B2
(45) Date of Patent: Jan. 14, 2025

(54) INTELLIGENT-CLEANING STEAM OVEN LINER AND INTEGRATED STOVE

(71) Applicant: ZHEJIANG SENG SMART KITCHEN APPLIANCE CO., LTD, Zhejiang (CN)

(72) Inventors: Jianjun Zhang, Zhejiang (CN); Dezhong Fan, Zhejiang (CN); Zhikang Xu, Zhejiang (CN); Songtao Wei, Zhejiang (CN); Yingjie Qian, Zhejiang (CN); Shengfeng Lv, Zhejiang (CN)

(73) Assignee: ZHEJIANG SENG SMART KITCHEN APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 18/709,323

(22) PCT Filed: Mar. 13, 2024

(86) PCT No.: PCT/CN2024/081359
§ 371 (c)(1),
(2) Date: May 10, 2024

(87) PCT Pub. No.: WO2024/193408
PCT Pub. Date: Sep. 26, 2024

(65) Prior Publication Data
US 2024/0328630 A1    Oct. 3, 2024

(30) Foreign Application Priority Data
Mar. 17, 2023    (CN) .......................... 202310281682.7

(51) Int. Cl.
*F24C 13/00*    (2006.01)
*F24C 7/06*    (2006.01)
(Continued)

(52) U.S. Cl.
CPC .............. *F24C 14/005* (2013.01); *F24C 7/06* (2013.01); *F24C 15/003* (2013.01); *F24C 15/325* (2013.01); *F24C 15/327* (2013.01)

(58) Field of Classification Search
CPC ........ F24C 14/005; F24C 7/06; F24C 15/003; F24C 15/325; F24C 15/327
(Continued)

(56) References Cited

U.S. PATENT DOCUMENTS

| 1,226,044 | A | * | 5/1917 | Wilson | .................... | A47J 27/16 |
|---|---|---|---|---|---|---|
|   |   |   |   |   |   | 126/20.2 |
| 3,445,038 | A | * | 5/1969 | Doornbos | ................. | B08B 9/08 |
|   |   |   |   |   |   | 222/642 |

(Continued)

FOREIGN PATENT DOCUMENTS

| CN | 102940475 A | 2/2013 |
|---|---|---|
| CN | 109247804 A | 1/2019 |

(Continued)

OTHER PUBLICATIONS

Chinese Office Action for 202310281682.7, dated Jul. 13, 2023.
Chinese Notification to Grant patent Right for Invention 202310281682.7, dated Sep. 6, 2023.

*Primary Examiner* — Avinash A Savani
(74) *Attorney, Agent, or Firm* — Sughrue Mion, PLLC (57) ABSTRACT

An intelligent-cleaning steam oven liner includes a liner body, a door, a heating system, and a spray system. The heating system is used for cooking food in the liner body, and after the food in the liner body is cooked, the spray system cleans an inner wall surface of the liner body. The door is in seal fit with the liner body, and the heating system and the spray system are arranged in the liner body. The heating system realizes the food steaming and roasting function of a steam oven, and after the food is cooked by the heating system, the spray system operates to clean the inner wall of the liner body to keep the liner body clean.

7 Claims, 5 Drawing Sheets

(51) Int. Cl.
    *F24C 14/00*     (2006.01)
    *F24C 15/00*     (2006.01)
    *F24C 15/32*     (2006.01)

(58) Field of Classification Search
    USPC .......................................................... 126/20
    See application file for complete search history.

(56) References Cited

U.S. PATENT DOCUMENTS

| | | | | |
|---|---|---|---|---|
| 4,506,598 | A * | 3/1985 | Meister | F24C 15/327 |
| | | | | 426/523 |
| 4,884,553 | A * | 12/1989 | Schwarzbacker | F24C 15/327 |
| | | | | 219/401 |
| 5,193,491 | A * | 3/1993 | Oslin | F22B 37/486 |
| | | | | 122/401 |
| 8,193,470 | B1 * | 6/2012 | Harlamert | F24C 14/005 |
| | | | | 219/400 |
| 2006/0034987 | A1 | 2/2006 | Thakur et al. | |
| 2008/0075823 | A1 * | 3/2008 | Jeon | F24C 15/327 |
| | | | | 99/325 |
| 2015/0030728 | A1 * | 1/2015 | Raghavan | A47J 27/04 |
| | | | | 99/330 |

FOREIGN PATENT DOCUMENTS

| | | |
|---|---|---|
| CN | 109998385 A | 7/2019 |
| CN | 110353510 A | 10/2019 |
| CN | 113413074 A | 9/2021 |
| CN | 114521811 A | 5/2022 |

* cited by examiner

INTELLIGENT-CLEANING STEAM OVEN LINER AND INTEGRATED STOVE

CROSS REFERENCE TO RELATED APPLICATIONS

This application is a National Stage of International Application No. PCT/CN2024/081359 filed Mar. 13, 2024, claiming priority based on Chinese Patent Application No. 202310281682.7 filed Mar. 17, 2023.

BACKGROUND OF THE INVENTION

1. Technical Field

The invention belongs to the technical field of kitchen equipment, and particularly relates to an intelligent-cleaning steam oven liner and an integrated stove.

2. Description of Related Art

At present, food is processed worldwide by frying, stir-frying, deep-frying, steaming, stewing, simmering and roasting, among which steaming and roasting are used most frequently, indicating that these two food processing methods are preferred by people. For example, the most common staple foods, rice and steamed breads, are processed by steaming, and barbecued meat which is popular nowadays, such as roasted mutton cubes, is closely related to the roasting process. With the development of economy and the progress of society, people put forward higher requirements for the diversity of foods, leading to higher requirements for food processes. Some foods not only need to be steamed, but also need to be roasted, wherein part of these foods need to be steamed and then roasted, while part of these foods need to be roasted and then steamed. The use of a steamer and an oven to complete the steaming process and the roasting process makes operations discontinuous, leading to low efficiency; and the transfer of foods from one device to another device will result in a negative influence on the quality of foods. Especially, the continuous expansion of the marketization scale in nowadays puts forward high requirements for the production efficiency of any food, and in order to improve the production efficiency, manufacturers consider to integrate the steaming process and the roasting process to one food device, leading to the emergency of steam ovens, which are continuously developed in recent years and have become common kitchenware in modern kitchens.

Integrated stoves, which are of a deep well type or a side suction type, can miraculously suck away cooking fume downwards under the action of a negative-pressure region of fluid generated by exhaust air based on the micro-aerodynamic principle to prevent the cooking fume from being diffused everywhere and can suck away over 95% of the cooking fume. The integrated stove, as an internationally advanced kitchen household appliance developed to solve the problem that traditional range hoods cannot completely eradicate cooking fume and improve the kitchen and home environment, organically integrates a range hood, a stove, a disinfection cabinet and a storage cabinet and completely eradicates kitchen fume, thus completely eliminating the last polluted area of residences and bringing a profound influence on Chinese kitchens characterized by deep-fat stir-frying.

After food is cooked in a steam oven, the inner wall and dead corners of a liner body of the steam oven will be stained with oil. In the prior art, the liner body of the steam oven is often cleaned by users manually, which is time-consuming and labor-consuming; in addition, the dead corners of the liner body cannot be completely cleaned, leading to a negative influence on food cooked next time and reducing the taste of food: if the liner body cannot to be cleaned timely, bacteria will breed, and the inner wall of the liner body of the steam oven will be corroded, compromising the service life of the steam oven.

BRIEF SUMMARY OF THE INVENTION

The objective of the invention is to solve the abovementioned technical problems existing in the prior art by providing an intelligent-cleaning steam oven liner and an integrated stove. The intelligent-cleaning steam oven liner is provided with a liner body and a door, wherein the door is in seal fit with the liner body, a heating system and a spray system are arranged in the liner body, the heating system realizes the food steaming and roasting function of a steam oven, and after the food is cooked by the heating system, the spray system operates to clean the inner wall of the liner body to keep the liner body clean, thus guaranteeing a clean environment for food cooking and avoiding bacterium breeding in the liner body: in addition, the liner body does not need to be manually cleaned by users, thus saving time and labor and greatly improving usage experience of the steam oven.

To solve the above technical problems, the invention adopts the following technical solution:

An intelligent-cleaning steam oven liner comprises a liner body and a door, wherein the door is in seal fit with the liner body to form a working chamber: the intelligent-cleaning steam oven liner further comprise a heating system and a spray system, the heating system is used for cooking food in the liner body, and after the food in the liner body is cooked, the spray system cleans an inner wall surface of the liner body. According to the invention, the intelligent-cleaning steam oven liner is provided with the liner body and the door, the door is in seal fit with the liner body, the heating system and the spray system are arranged in the liner body, the heating system realizes the food steaming and roasting function of a steam oven, and after the food is cooked by the heating system, the spray system operates to clean the inner wall of the liner body to keep the liner body clean, thus guaranteeing a clean environment for food cooking and avoiding bacterium breeding in the liner body: in addition, the liner body does not need to be manually cleaned by users, thus saving time and labor and greatly improving usage experience of the steam oven.

Further, the liner body is connected to a pure water box and a replacement box, the pure water box is connected to the heating system and the spray system, a drain port is formed in a bottom surface of the liner body, the bottom surface of the liner body inclines towards a center to form a drainage region, the drain port is formed in a center of the drainage region and connected to the replacement box, and the replacement box is connected to the spray system. The pure water box is used for storing pure water, a cleaning solution is contained in the replacement box, and the pure water in the pure water box is used for steaming and roasting food in the liner body by means of the heating system; the cleaning solution in the replacement box is used for cleaning an inner wall of the liner body by means of the spray system: after the liner body is cleaned with the cleaning solution, part of the cleaning solution will be left on the liner body, and at this moment, the pure water in the pure water box is used to wash the liner body by means of the spray system; and after the liner body is washed, the water enters the replacement box via the drain port to replace sewage in the replacement box, such that the liner body is cleaned.

Further, the heating system comprises a steam generator, a water pump, a top heating coil, side heating pipes and a heating plate, the heating plate is arranged on a bottom surface of the inner wall of the liner body, the side heating pipes are arranged on side faces of the inner wall of the liner body, and the top heating coil is arranged on a top surface of the inner wall of the liner body; and water in the pure water tank is pumped by the water pump into the steam generator to be heated and then heats the food in the liner body by means of the side heating pipes and the top heating coil. The pure water in the pure water box is controlled by the water pump to enter the steam generator to be heated to heat and cook the food in the liner body by means of the side heating pipes and the top heating coil, and at the same time, the heating plate generates heat to heat and cook the food in the liner body.

Further, circulating fans are arranged on two side walls of an interior the liner body. After food in the liner body is heated by the heating system, the circulating fans control heat in the liner body to circulate sufficiently, thus guaranteeing that the food can be uniformly heated in all directions.

Further, the spray system comprises a centrifugal pump and a spray arm, and the centrifugal pump is connected to the pure water box and the replacement box respectively and is also connected to the spray arm to allow water in the replacement box and water in the pure water box to be sprayed sequentially by means of the spray arm. Water in the replacement box is delivered into the spray arm in the liner body by means of the centrifugal pump, the spray arm sprays the cleaning solution into the liner body to clean the liner body, then the pure water in the pure water box is delivered into the spray arm in the liner body by means of the centrifugal pump, the spray arm sprays the pure water into the liner body to clean the liner body, and then the water is discharged into the replacement box via the drain port, such that the liner body is cleaned.

Further, a heating pipe is arranged between the centrifugal pump and the spray arm to heat the cleaning solution. When the centrifugal pump delivers the cleaning solution from the replacement box to the spray arm, the cleaning solution is heated by the heating pipe, thus improving the cleaning effect of the cleaning solution.

Further, a first mechanical check valve is connected to a bottom of the pure water box, a second mechanical check valve is connected to a bottom of the replacement box, the first mechanical check valve is connected to a first solenoid valve, the second mechanical check valve is connected to a second solenoid valve, and a T-pipe is connected between the first solenoid valve, the second solenoid valve and the centrifugal pump. The first mechanical check valve controls the delivery direction of the pure water in the pure water box, the second mechanical check valve controls the delivery direction of the cleaning solution in the replacement box, and the first solenoid valve and the second solenoid valve control the pure water in the pure water box and the cleaning solution in the replacement box to be delivered sequentially.

Further, the spray arm comprises a rotating arm, a water pipe joint and a spindle, one end of the water pipe joint is connected to the T-pipe, the other end of the water pipe joint is connected to the spindle, the water pipe joint is provided with a joint flange which is tightened between the water pipe joint and the spindle by means of a lock nut, the rotating arm is rotatably connected to the spindle, water outlets corresponding to a circumference of the rotating arm are distributed in the spindle, and the rotating arm is connected to the water pipe joint by means of the water outlets. The cleaning solution or pure water is delivered into the spindle from the water pipe joint by means of the T-pipe and then flows from the spindle into the rotating arm via the water outlets.

Further, the rotating arm comprises an upper shell, a lower shell and a rotating portion, the rotating portion corresponds to the water outlets and is rotatably connected to an outer side of the spindle, through-holes are formed in a circumference of the rotating portion, a temporary water storage cavity is formed after the upper shell and the lower shell are connected in sealed manner, the through-holes are connected to the temporary water storage cavity, and spray holes are uniformly distributed in a top surface of the upper shell and a bottom surface of the lower shell and connected to the temporary water storage cavity. The cleaning solution or pure water discharged via the water outlets enters the temporary water storage cavity via the through-holes and is then sprayed via the spray holes in the upper shell and the lower shell, such that water can be sprayed out from both the upper end and the lower end of the spray arm to clean the inner wall of the liner body.

An integrated stove comprises the intelligent-cleaning steam oven liner.

By adopting the above technical solution, the invention has the following beneficial effects:

According to the invention, the intelligent-cleaning steam oven liner is provided with the liner body and the door, the door is in seal fit with the liner body, the heating system and the spray system are arranged in the liner body, the heating system realizes the food steaming and roasting function of a steam oven, and after the food is cooked by the heating system, the spray system operates to clean the inner wall of the liner body to keep the liner body clean, thus guaranteeing a clean environment for food cooking and avoiding bacterium breeding in the liner body: in addition, the liner body does not need to be manually cleaned by users, thus saving time and labor and greatly improving usage experience of the steam oven.

According to the invention, the liner body is connected to the pure water box and the replacement box, the pure water box is connected to the heating system and the spray system, the drain port is formed in the bottom surface of the liner body, the bottom surface of the liner body inclines towards the center to form the drainage region, the drain port is formed in the center of the drainage region and connected to the replacement box, and the replacement box is connected to the spray system. The pure water box is used for storing pure water, a cleaning solution is contained in the replacement box, and the pure water in the pure water box is used for steaming and roasting food in the liner body by means of the heating system: the cleaning solution in the replacement box is used for cleaning the inner wall of the liner body by means of the spray system; after the liner body is cleaned with the cleaning solution, part of the cleaning solution will be left on the liner body, and at this moment, the pure water in the pure water box is used to wash the liner body by means of the spray system; and after the liner body is washed, the water enters the replacement box via the drain port to replace sewage in the replacement box, such that the liner body is cleaned.

According to the invention, the spray arm comprises the rotating arm, the water pipe joint and the spindle, one end of the water pipe joint is connected to the T-pipe, the other end of the water pipe joint is connected to the spindle, the water pipe joint is provided with the joint flange which is tightened between the water pipe joint and the spindle by means of the lock nut, the rotating arm is rotatably connected to the spindle, the water outlets corresponding to the circumference of the rotating arm are distributed in the spindle, and the rotating arm is connected to the water pipe joint by means of the water outlets. The cleaning solution or pure water is delivered into the spindle from the water pipe joint by means of the T-pipe and then flows from the spindle into the rotating arm via the water outlets.

BRIEF DESCRIPTION OF THE SEVERAL VIEWS OF THE DRAWINGS

The invention is further described below in conjunction with accompanying drawings.

Figure 1:
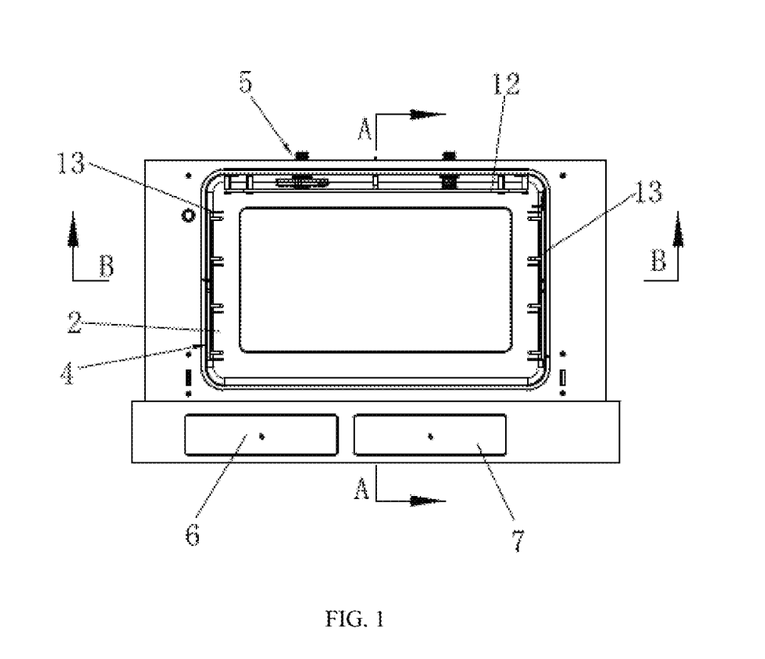
FIG. 1 is a schematic structural diagram of an intelligent-cleaning steam oven liner according to the invention.

In the FIGS. 1, rotating arm; 2, liner body; 3, door; 4, heating system; 5, spray system; 6, pure water box; 7, replacement box; 8, drain port; 9, drainage region; 10, steam generator; 11, water pump; 12, top heating coil; 13, side heating pipe; 14, heating plate; 15, circulating fan; 16, centrifugal pump; 17, spray arm; 18, heating pipe; 19, first mechanical check valve; 20, second mechanical check valve; 21, first solenoid valve; 22, second solenoid valve; 23, T-pipe; 24, water pipe joint; 25, spindle; 26, joint flange; 27, lock nut; 28, water outlet; 29, upper shell; 30, lower shell; 31, rotating portion; 32, through-hole; 33, spray hole; 34, integrated stove; 35, third solenoid valve; 36, water flow sensor; 37, fourth solenoid valve; 38, joint; 39, oil box.

DETAILED DESCRIPTION OF THE INVENTION

As shown in FIG. 1 to FIG. 9, the invention provides an intelligent-cleaning steam oven liner, comprising a liner body 2 and a door 3, wherein the door 3 is in seal fit with the liner body 2 to form a working chamber: the intelligent-cleaning steam oven liner further comprises a heating system 4 and a spray system 5, the heating system 4 is used for cooking food in the liner body 2, and after the food in the liner body 2 is cooked, the spray system 5 cleans an inner wall surface of the liner body 2.

The liner body 2 is connected to a pure water box 6 and a replacement box 7, the pure water box 6 is connected to the heating system 4 and the spray system 5, a drain port 8 is formed in a bottom surface of the liner body 2, the bottom surface of the liner body 2 inclines towards the center to form a drainage region 9, the drain port 8 is formed in the center of the drainage region 9 and connected to the replacement box 7, and the replacement box 7 is connected to the spray system 5. The pure water box 6 is used for storing pure water, a cleaning solution is contained in the replacement box 7, and the pure water in the pure water box 6 is used for steaming and roasting food in the liner body 2 by means of the heating system 4; the cleaning solution in the replacement box 7 is used for cleaning an inner wall of the liner body 2 by means of the spray system 5: after the liner body 2 is cleaned with the cleaning solution, part of the cleaning solution will be left on the liner body 2, and at this moment, the pure water in the pure water box 6 is used to wash the liner body 2 by means of the spray system 5; and after the liner body 2 is washed, the water enters the replacement box 7 via the drain port 8 to replace sewage in the replacement box 7, such that the liner body 2 is cleaned.

Figure 2:
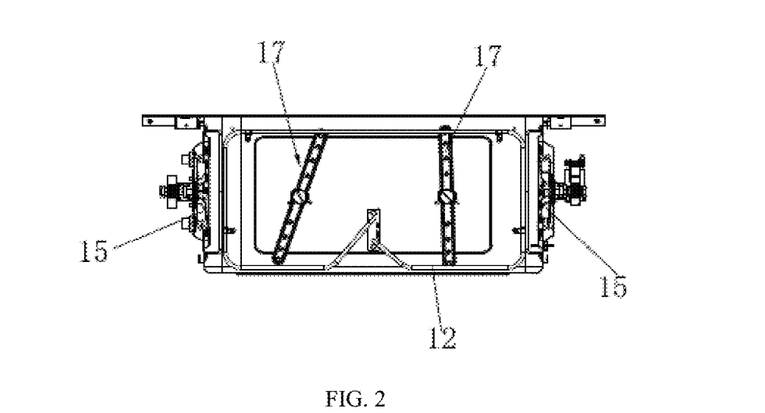
FIG. 2 is a sectional view along B-B in FIG. 1.
Figure 3:
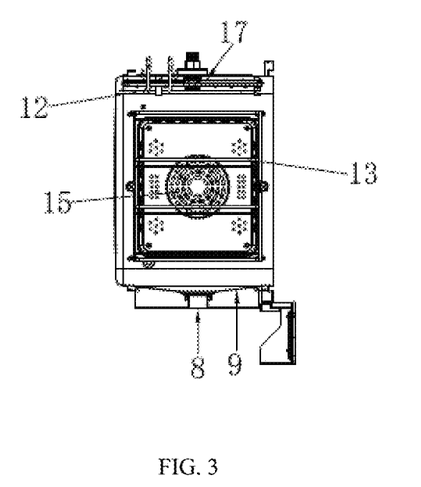
FIG. 3 is a sectional view along A-A in FIG. 1.

The heating system 4 comprises a steam generator 10, a water pump 11, a top heating coil 12, side heating pipes 13 and a heating plate 14, wherein the heating plate 14 is arranged on a bottom surface of the inner wall of the liner body 2, the side heating pipes 13 are arranged on side faces of the inner wall of the liner body 2, and the top heating coil 12 is arranged on a top surface of the inner wall of the liner body 2: the pure water in the pure water box 6 is pumped by the water pump 11 into the steam generator 10 and is then heated to heat food in the liner body 2 by means of the side heating pipes 13 and the top heating coil 12. The pure water in the pure water box 6 is controlled by the water pump 11 to enter the steam generator 10 to be heated to heat and cook the food in the liner body 2 by means of the side heating pipes 13 and the top heating coil 12, and at the same time, the heating plate 14 generates heat to heat and cook the food in the liner body 2. Circulating fans 15 are arranged on two side walls of the interior the liner body 2 respectively. After food in the liner body 2 is heated by the heating system 4, the circulating fans 15 control heat in the liner body 2 to circulate sufficiently, thus guaranteeing that the food can be uniformly heated in all directions.

The spray system 5 comprises a centrifugal pump 16 and spray arms 17, the centrifugal pump 16 is connected to the pure water box 6 and the replacement box 7 and is also connected to the spray arms 17 to allow water in the replacement box 7 and the pure water in the pure water box 6 to be sprayed sequentially by means of the spray arms 17. The cleaning solution in the replacement box 7 is delivered into the spray arms 17 in the liner body 2 by means of the centrifugal pump 16, the spray arms 17 spray the cleaning solution into the liner body 2 to clean the liner body 2, then the pure water in the pure water box 6 is delivered into the spray arms 17 in the liner body 2 by means of the centrifugal pump 16, the spray arms 17 spray the pure water into the liner body 2 to clean the liner body 2, and then the water is discharged into the replacement box 7 via the drain port 8, such that the liner body 2 is cleaned. A heating pipe 18 is arranged between the centrifugal pump 16 and the spray arms 17 to heat the cleaning solution. When the centrifugal pump 16 delivers the cleaning solution from the replacement box 7 to the spray arms 17, the cleaning solution is heated by the heating pipe 18, thus improving the cleaning effect of the cleaning solution. A first mechanical check valve 19 is connected to the bottom of the pure water box 6, a second mechanical check valve 20 is connected to the bottom of the replacement box 7, the first mechanical check valve 19 is connected to a first solenoid valve 21, the second mechanical check valve 20 is connected to a second solenoid valve 22, and a T-pipe 23 is connected between the first solenoid valve 21, the second solenoid valve 22 and the centrifugal pump 16. The first mechanical check valve 19 controls the delivery direction of the pure water in the pure water box 6, the second mechanical check valve 20 controls the delivery direction of the cleaning solution in the replacement box 7, and the first solenoid valve 21 and the second solenoid valve 22 control the pure water in the pure water box 6 and the cleaning solution in the replacement box 7 to be delivered sequentially. Each spray arm 17 comprises a rotating arm 1, a water pipe joint 24 and a spindle 25, wherein one end of the water pipe joint 24 is connected to the T-pipe 23, the other end of the water pipe joint 24 is connected to the spindle 25, the water pipe joint 24 is provided with a joint flange 26 which is tightened between the water pipe joint 24 and the spindle 25 by means of a lock nut 27, the rotating arm 1 is rotatably connected to the spindle 25, water outlets 28 corresponding to the circumference of the rotating arm 1 are distributed in the spindle 25, and the rotating arm 1 is connected to the water pipe joint 24 by means of the water outlets 28. The cleaning solution or pure water is delivered into the spindle 25 from the water pipe joint 24 by means of the T-pipe 23 and then flows from the spindle 25 into the rotating arm 1 via the water outlets 28. The rotating arm 1 comprises an upper shell 29, a lower shell 30 and a rotating portion 31, wherein the rotating portion 31 corresponds to the water outlets 28 and is rotatably connected to an outer side of the spindle 25, through-holes 32 are formed in the circumference of the rotating portion 31, a temporary water storage cavity is formed after the upper shell 29 and the lower shell 30 are connected in sealed manner, the through-holes 32 are connected to the temporary water storage cavity, spray holes 33 are uniformly distributed in a top surface of the upper shell 29 and a bottom surface of the lower shell 30 and are connected to the temporary water storage cavity. The cleaning solution or pure water discharged via the water outlets 28 enters the temporary water storage cavity via the through-holes 32 and is then sprayed via the spray holes in the upper shell 29 and the lower shell 30, such that water can be sprayed out from both the upper end and the lower end of the spray arm 17 to clean the inner wall of the liner body 2.

According to the invention, the intelligent-cleaning steam oven liner is provided with the liner body 2 and the door 3, the door 3 is in seal fit with the liner body 2, the heating system 4 and the spray system 5 are arranged in the liner body 2, the heating system 4 realizes the food steaming and roasting function of a steam oven, and after the food is cooked by the heating system 4, the spray system 5 operates to clean the inner wall of the liner body 2 to keep the liner body 2 clean, thus guaranteeing a clean environment for food cooking and avoiding bacterium breeding in the liner body 2; in addition, the liner body 2 does not need to be manually cleaned by users, thus saving time and labor and greatly improving usage experience of the steam oven.

Figure 10:
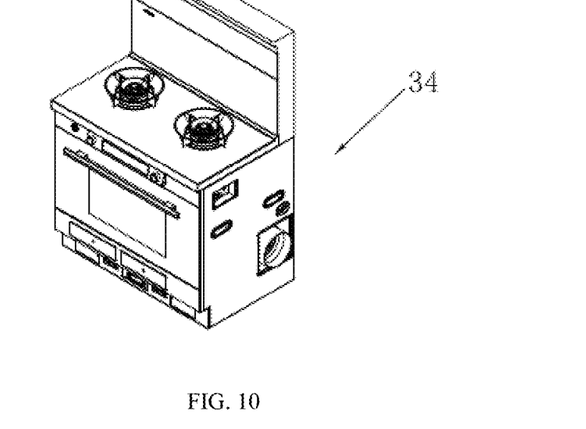
FIG. 10 is a schematic structural diagram of an integrated stove with the self-cleaning steam oven liner.
Figure 11:
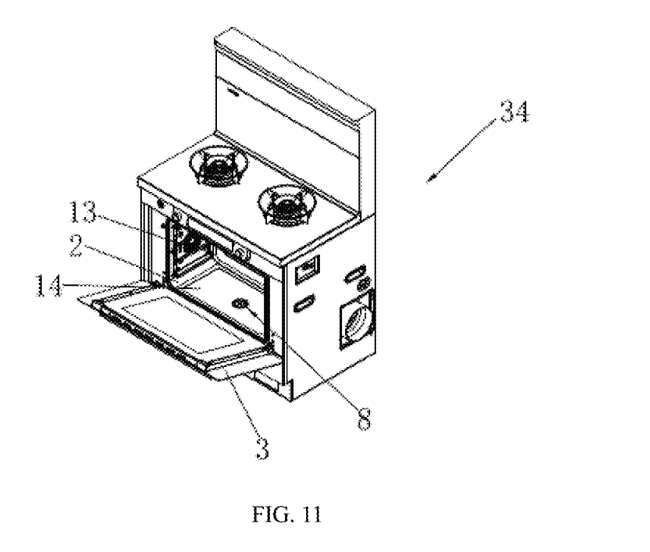
FIG. 11 is a schematic structural diagram of the integrated stove with a door in an open state according to the invention.

As shown in FIG. 10 and FIG. 11, the invention also provides an integrated stove comprising the self-cleaning steam oven liner.

Figure 4:
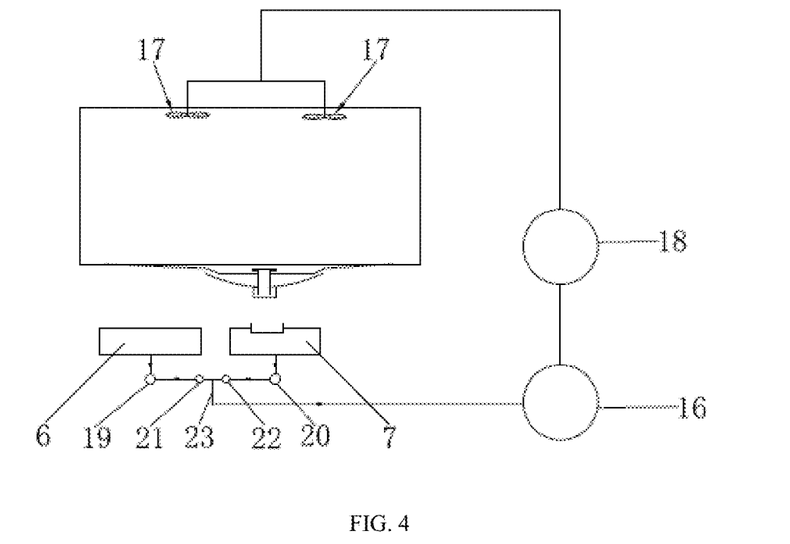
FIG. 4 is a schematic flow diagram of cleaning of a liner body according to the invention.
Figure 5:
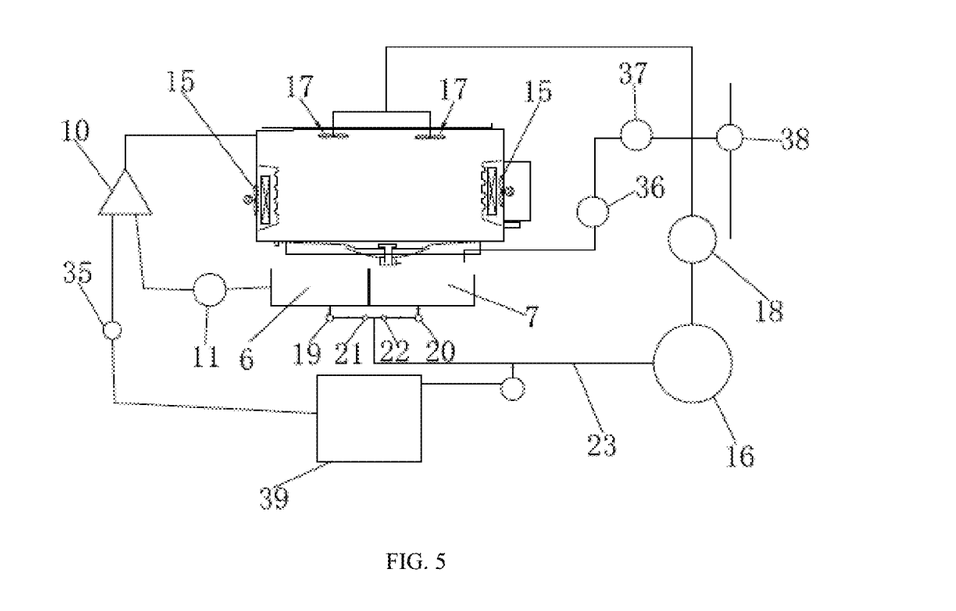
FIG. 5 is a schematic flow diagram of the operation of the liner body according to the invention.
Figure 6:
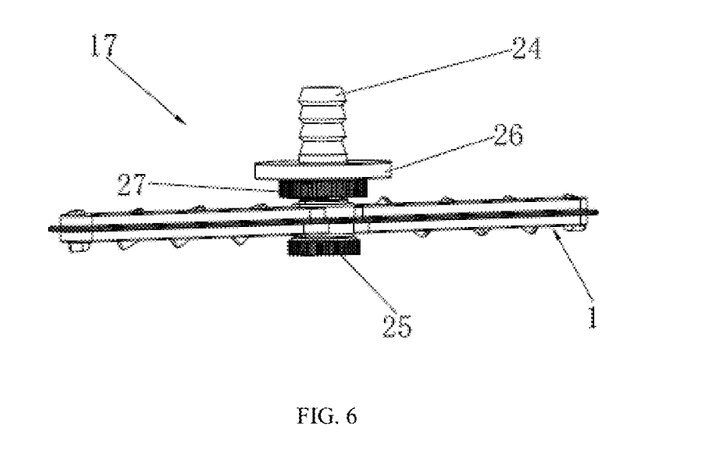
FIG. 6 is a schematic structural diagram of a spray arm according to the invention.
Figure 7:
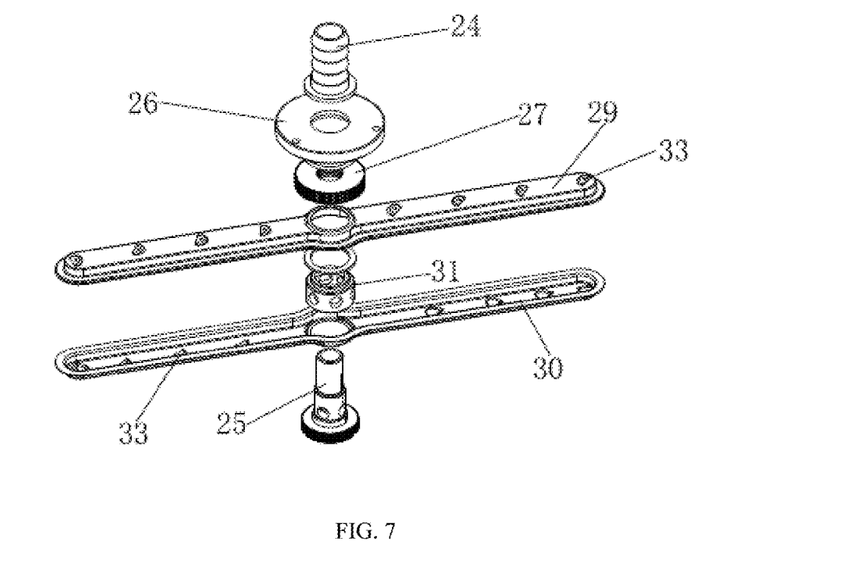
FIG. 7 is a schematic exploded view of FIG. 6.
Figure 8:
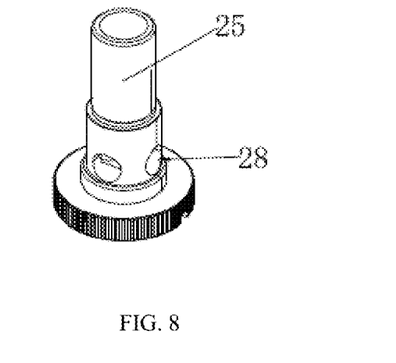
FIG. 8 is a schematic structural diagram of a spindle according to the invention.
Figure 9:
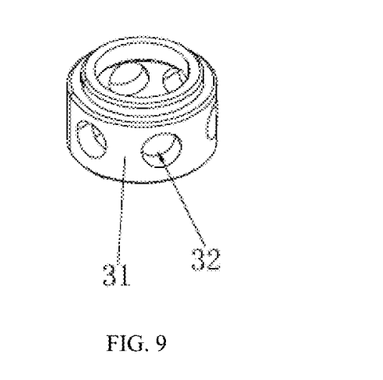
FIG. 9 is a schematic structural diagram of a rotating portion according to the invention.

The operating principle of an intelligent-cleaning steam oven is as follows:
1. Heating: first, pure water in the pure water box 6 is controlled by the water pump 11 to be delivered into the steam generator 10 to be heated to generate steam, then food in the liner body 2 is heated to be cooked by means of the side heating pipes 13 and the top heating coil 12, at the same time, the circulating fans 15 on two sides of the liner body 2 are controlled to operate to allow the steam to circulate in the liner body 2 to ensure that the food in the liner body 1 can be sufficiently heated, and after the food is cooked, residual water in the steam generator 10 is delivered into an oil box 39 by means of a third solenoid valve 35;
2. Cyclic cleaning: a cleaning solution is added into the replacement box 7, the cleaning solution is delivered by the centrifugal pump 16 into the heating pipe 18 to be heated and is then delivered into the spray arms 17, the spray arms 17 spray the cleaning solution into the liner body 2 to clean the top surface and side walls of the interior of the liner body 2, the water is then discharged into the replacement box 7 via the drain port 8, and the liner body 2 is cyclically cleaned for 10-40 min;
3. Washing with clean water: sewage in the replacement box 7 is poured out, pure water in the pure water box 6 is directly delivered by the centrifugal pump 16 into the spray arms 17 without being heated, and is sprayed into the liner body 2 by the spray arms 17 to wash the liner body 2, and after washing, the water is delivered into the replacement box 7 by means of the drain port 8 and does not circulate; and the liner body 2 is dried after being washed, then the pure water box 6 is filled with water again, and sewage in the replacement box 7 is poured out.

The replacement box 7 and the pure water box 6 can be connected to an external water source to be filled with water. Specifically, an elbow pipe is arranged, a water flow sensor 36, a fourth solenoid valve 37 and a joint 38 are arranged on the elbow pipe to automatically added water into the replacement box 7 and the pure water box from the external water source.

Sewage in the replacement box 7 can be automatically discharged into the oil box 39, thus realizing an automatic sewage discharge effect of the replacement box 7.

In the invention, first arc-shaped plates 6 are welded between a front panel 3 and side panels 4, and second arc-shaped plates 7 are welded between the side panels 4 and a rear panel 5, such that operators are protected by the arc-shaped plates between the panels: the side panels 4 and the rear panel 5 are further protected, and the overall thickness is increased based on the side panels 4 and the rear panel 5, thus preventing deformation of the side panels 4 and the rear panel 5.

The above embodiments are merely specific embodiments of the invention, and the technical features of the invention are not limited to the above embodiments. Any simple variations, equivalent substitutions or modifications made based on the invention to solve basically the same technical problems and fulfill basically the same technical effects should also fall within the protection scope of the invention.

What is claimed is:

1. An intelligent-cleaning steam oven liner, comprising a liner body and a door, the door being in seal fit with the liner body to form a working chamber, wherein the intelligent-cleaning steam oven liner further comprise a heating system and a spray system, the heating system is used for cooking food in the liner body, and after the food in the liner body is cooked, the spray system cleans an inner wall surface of the liner body; the liner body is connected to a pure water box and a replacement box, the pure water box is connected to the heating system and the spray system, a drain port is formed in a bottom surface of the liner body, the bottom surface of the liner body inclines towards a center to form a drainage region, the drain port is formed in a center of the drainage region and connected to the replacement box, and the replacement box is connected to the spray system; and the spray system comprises a centrifugal pump and a spray arm, and the centrifugal pump is connected to the pure water box and the replacement box respectively and is also connected to the spray arm to allow water in the replacement box and water in the pure water box to be sprayed sequentially by means of the spray arm;

wherein the heating system comprises a steam generator, a water pump, a top heating coil, side heating pipes and a heating plate, the heating plate is arranged on a bottom surface of an inner wall of the liner body, the side heating pipes are arranged on side faces of the inner wall of the liner body, and the top heating coil is arranged on a top surface of the inner wall of the liner body; and water in the pure water tank is pumped by the water pump into the steam generator to be heated and then heats the food in the liner body by means of the side heating pipes and the top heating coil.

2. The intelligent-cleaning steam oven liner according to claim 1 wherein circulating fans are arranged on two side walls of an interior of the liner body.

3. The intelligent-cleaning steam oven liner according to claim 1, wherein a heating pipe is arranged between the centrifugal pump and the spray arm.

4. An intelligent-cleaning steam oven liner, comprising a liner body and a door, the door being in seal fit with the liner body to form a working chamber, wherein the intelligent-cleaning steam oven liner further comprise a heating system and a spray system, the heating system is used for cooking food in the liner body, and after the food in the liner body is cooked, the spray system cleans an inner wall surface of the liner body; the liner body is connected to a pure water box and a replacement box, the pure water box is connected to the heating system and the spray system, a drain port is formed in a bottom surface of the liner body, the bottom surface of the liner body inclines towards a center to form a drainage region, the drain port is formed in a center of the drainage region and connected to the replacement box, and the replacement box is connected to the spray system; and the spray system comprises a centrifugal pump and a spray arm, and the centrifugal pump is connected to the pure water box and the replacement box respectively and is also connected to the spray arm to allow water in the replacement box and water in the pure water box to be sprayed sequentially by means of the spray arm;

wherein a first mechanical check valve is connected to a bottom of the pure water box, a second mechanical check valve is connected to a bottom of the replacement box, the first mechanical check valve is connected to a first solenoid valve, the second mechanical check valve is connected to a second solenoid valve, and a T-pipe is connected between the first solenoid valve, the second solenoid valve and the centrifugal pump.

5. The intelligent-cleaning steam oven liner according to claim 4, wherein the spray arm comprises a rotating arm, a water pipe joint and a spindle, one end of the water pipe joint is connected to the T-pipe, the other end of the water pipe joint is connected to the spindle, the water pipe joint is provided with a joint flange which is tightened between the water pipe joint and the spindle by means of a lock nut, the rotating arm is rotatably connected to the spindle, water outlets corresponding to a circumference of the rotating arm are distributed in the spindle, and the rotating arm is connected to the water pipe joint by means of the water outlets.

6. The intelligent-cleaning steam oven liner according to claim 5, wherein the rotating arm comprises an upper shell, a lower shell and a rotating portion, the rotating portion corresponds to the water outlets and is rotatably connected to an outer side of the spindle, through-holes are formed in a circumference of the rotating portion, a temporary water storage cavity is formed after the upper shell and the lower shell are connected in sealed manner, the through-holes are connected to the temporary water storage cavity, and spray holes are uniformly distributed in a top surface of the upper shell and a bottom surface of the lower shell and connected to the temporary water storage cavity.

7. An integrated stove, comprising the intelligent-cleaning steam oven line according to claim 1.

* * * * *